United States Patent

Van Der Arend et al.

Patent Number: 5,691,429
Date of Patent: Nov. 25, 1997

[54] MANUFACTURING PROCESS FOR HIGH CIS POLY(BUTADIENE)

[75] Inventors: Johannes Cornelis Maria Van Der Arend; Marijke De Boer-Wildschut; Adriaan Albert Van Der Huizen; Maria Johanna Elisabeth Kersten, all of Amsterdam, Netherlands

[73] Assignee: Shell Oil Company, Houston, Tex.

[21] Appl. No.: 733,709

[22] Filed: Oct. 17, 1996

[30] Foreign Application Priority Data

Oct. 18, 1995 [EP] European Pat. Off. ............ 95307411

[51] Int. Cl.$^6$ ............................. C08F 4/70; C08F 136/06
[52] U.S. Cl. .................. 526/92; 526/93; 526/142; 526/340.4
[58] Field of Search .................. 526/92, 93, 142, 526/340.4

[56] References Cited

U.S. PATENT DOCUMENTS

| | | | |
|---|---|---|---|
| 4,224,426 | 9/1980 | Odar | 526/92 |
| 4,242,478 | 12/1980 | Lasis | 526/93 |
| 4,303,769 | 12/1981 | Odar | 526/93 |
| 4,314,045 | 2/1982 | Odar . | |
| 4,696,986 | 9/1987 | Halasa et al. . | |
| 5,397,851 | 3/1995 | Knauf et al. | 526/92 |

FOREIGN PATENT DOCUMENTS 77017   5/1962   France .

*Primary Examiner*—Fred Teskin
*Attorney, Agent, or Firm*—Donald F. Haas

[57] ABSTRACT

A process for the manufacture of linear, substantially gel free, high cis 1,4 poly(butadiene) comprising polymerization in the presence of (a) a catalyst comprising at least one cobalt compound, at least one organoaluminium compound, and water, and (b) a cycloalkane as main solvent component, and (c) at least one substituted benzene as polymerization regulator of the general formula

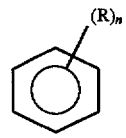

wherein n is an integer in the range of from 3 to 5, and wherein each R represents a lower alkoxy group containing from 1 to 6 carbon atoms.

9 Claims, No Drawings

MANUFACTURING PROCESS FOR HIGH CIS POLY(BUTADIENE)

FIELD OF THE INVENTION

The invention relates to a manufacturing process for high cis poly(butadiene). More in particular the invention relates to a process for the manufacture of cis-1,4-poly(butadiene) by polymerizing 1,3 butadiene, in the presence of a catalyst comprising a mixture of a cobalt compound, at least one organoaluminium compound and water.

BACKGROUND OF THE INVENTION

Many commercial processes are known to produce high-cis polybutadiene in a continuous way in an aromatic solvent like toluene or benzene. However, due to environmental concerns these solvents tend to be replaced by aliphatic solvents like cyclohexane. In these solvents the polymerization control tends to be troublesome, leading to deviations in the required polymer structure and, eventually, to increased gel content of the product.

Therefore, polymerization control agents (polymerization regulators) have been developed as known from, e.g., British Patent Application No. 2035341. Said application discloses that with the use of a cycloalkane having 5 to 8 carbon atoms, and in particular cyclohexane, as main solvent in the polymerization of butadiene, the polymerization proceeded too rapidly, as a result of which it was difficult to control the polymerization temperature. A consequence of this was a high cis-poly-(butadiene) of lower linearity, which did not show the desired physical properties.

In order to avoid this disadvantage, a small amount, i.e. from 0.1 to 2 wt % relative to the weight of cycloalkane, of an alkyl substituted benzene was used. This slowed the initial polymerization rate so that it could be easily controlled whereas the use of significant amounts of aromatic solvents such as benzene, toluene and the like could be avoided too. The alkyl substituted benzene polymerization regulator applied in said process had 1 to 4 alkyl substituents with each substituent having from 1 to 4 carbon atoms and preferably two or three methyl or ethyl groups. As specific examples of said alkyl substituted benzene polymerization regulator were mentioned: toluene, O-, m-, p-xylene or a mixture of xylene isomers, 1,3,5-trimethylbenzene (mesitylene) and other isomers of trimethylbenzene, or a mixture thereof, 1,2,4,5 tetramethylbenzene(durene) or other isomers of tetramethylbenzene (isodurene) or a mixture thereof, ethylbenzene, 1,2-, 1,3- or 1,4-diethylbenzene or a mixture of said isomers, n-propylbenzene 1,4-3-dipropylbenzene, n-butyl-benzene or a mixture of various alkyl substituted benzenes.

The cobalt catalyst component used was any organic compound such as cobalt salts of organic acids and cobalt complexes, the cobalt compound preferably being soluble in the solvent or the monomer. The organoaluminium catalyst component preferably was used an alkyl aluminium halide, which could be used as a mono- or dialkyl aluminium halide, a mixture thereof, or a mixture of $R_3Al,R_2AlX$, $RAlX_2$, or $AlX_3$ wherein R is alkyl of 1 to 12 carbon atoms and X is halogen and more preferably chloride. The preferred aluminium to cobalt ratios were those in the range from 50 to 300 and more preferably from 100 to 200. Trace amounts of water were also regarded as useful components of the polymerization catalyst system, normally added via either the solvents or the monomers.

Although the alkyl-substituted benzenes may offer good polymerization control in cyclohexane based feeds, relatively high levels of these compounds are needed to attain the required effects. This may be a draw-back in view of environmental concerns and acceptability of the product. More effective polymerization regulators are therefore needed. These should allow sufficient kinetic control and the production of polymers within the required (existing) specification limits, at very low concentration levels.

Therefore, it is an object of the present invention to provide an improved process for the manufacture of cis-1,4 poly(butadiene) providing a standardized high quality polymer, which contains an acceptably low amount of toxic chemicals. As a result of extensive research and experimentation such a process aimed at has surprisingly been found.

SUMMARY OF THE INVENTION

Accordingly, the present invention relates to a process of polymerizing 1,3-butadiene to produce primarily linear, substantially gel free, cis-1,4-poly(butadiene). The process comprises polymerization in the presence of a catalyst, comprising at least one cobalt compound, at least one organoaluminium compound, and water, and a cycloalkane as main solvent component, and containing at least one substituted benzene as polymerization regulator, characterized in that the polymerization regulators are compounds of the general formula

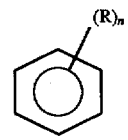

wherein n is an integer in the range of from 3 to 5. wherein each R represents lower alkoxy group, containing from 1 to 6 carbon atoms and preferably 1 to 4.

Examples of suitable modifiers may be selected from those having methoxy, ethoxy, isopropoxy, tert-butoxy, isobutoxy, n-pentoxy or isopentoxy substituents or mixtures thereof. More preferred embodiments of presently proposed polymerization regulators are those containing 3 or 4 of the hereinbefore defined lower alkoxy groups. More preferably compounds are used wherein 3 or 4 methoxy substituents are present. The most preferred modifiers was found to be 1,3,5-trimethoxy benzene.

It has been surprisingly found that the hereinbefore specified polymerization regulators, and in particular 1,3,5-trimethoxy benzene, could be used in a significantly smaller amount to provide the same effect, in comparison with the hereinbefore discussed prior art process, i.e. less than 0.1 wt % relative to the weight of the cycloalkane solvent. Consequently the process of the present invention has been found to enable the manufacture of cis-1,4-poly(butadiene) containing significantly smaller residual amounts of said regulator. Moreover, the use of the presently proposed modifiers has enabled the manufacture of poly(butadiene) rubbers, having a well controllable linearity index.

DETAILED DESCRIPTION OF THE INVENTION

The polymerization regulators are in general used in amounts of 100 ppm or less and in particular in amounts of from 5 to 60 ppm relative to the weight of the polymerization feed (solvent/butadiene/butene). More preferably, amounts of from 5 to 40 ppm are used.

The hereinbefore specified polymerization regulators are known per se and are manufactured and/or marketed by e.g.

APIN Chemicals Ltd., Milton Park, Abingdon, United Kingdom; Indofine Chemical Comp. Inc., Somerville, N.J. 8876, USA; Penta Manufacturing Company, Fairfield N.J., USA; Air Products SA, 11760, Brussels, Belgium.

Examples of cycloalkanes useful in the process of the present invention are those having 5 to 8 and preferably 5 or 6 carbon atoms in the rings. They also include methyl and ethyl substituted cycloalkanes. Illustrative examples of said cycloalkanes are cyclopentane, cyclohexane, cycloheptane, cyclooctane, methylcyclopentane, methylcyclohexane, methylcycloheptane, methycyclooctane, dimethylcyclopentane, dimethylcyclohexane, dimethylcycloheptane, ethylcyclopentane, ethylcylohexane, ethylcyclooctane or mixtures thereof. Preferred are unsubstituted cycloalkanes. Most preferred solvents are cyclopentane or cyclohexane.

One of the purposes of the solvent in this process is to control the polymerization temperature by refluxing the solvent and to keep the polymer dissolved. Often the desired temperature control is difficult to accomplish with only one solvent. However, by selecting two or more solvents which have certain desirable boiling points, the polymerization temperature can be relatively easily controlled. Therefore, the selection of the secondary solvent will depend primarily on its boiling point and the temperature that is to be maintained during polymerization. Thus by "solvent" is meant either a cycloalkane solvent or a mixture of two or more solvents, which mixture is substantially free of aromatics and in particular benzene. In any event, the monomer and the resulting polymer should be substantially soluble in the solvent. Useful secondary solvents are saturated aliphatic hydrocarbons, for example hexane, heptane or octane; olefins having 2 to 10 carbons for example butene-1, pentene-1 or hexene-1. Various ISOPAR solvents (sold by EXXON) are also found to be useful. They are a mixture of isoparaffinic hydrocarbon fractions boiling at certain temperature ranges. For example, ISOPAR C is primarily 2,2, 4-trimethylpentane and other trimethyl pentane isomers. This mixture boils at a range of approximately 206°–220° F. (96.7°–104° C.). The preferred secondary solvents are α-olefins, especially butene-1. The secondary solvent may be used in an amount 0 percent to 80 percent by weight of the cycloalkane solvent, and more preferably from 5 to 30 percent.

If desired, a molecular weight modifier may be employed in the process of this invention in order to control the molecular weight of the product. The molecular weight may be controlled by the monomer concentration, the catalyst concentration, and the ratio of the two catalyst components. However, it may be more convenient or more economical to employ a molecular weight modifier. Illustrative examples of particular useful molecular weight modifiers are non-conjugated dienes preferably those having 2 to 18 carbon atoms such as 1,2-butadiene, 1,4- and 1,5-hexadiene and the like; cyclic dienes preferably those having 6 to 12 carbon atoms such as 1,4-cyclohexadiene and 1,2 and 1,5-cyclooctadiene and the like. The molecular weight modifier is generally used in the amount of significantly less than 0.1 to 2 percent by weight of the cycloalkane, and more preferably from 200 ppm or less.

The catalysts that are employed in butadiene polymerizations are well known in the art. Various cobalt and aluminium compounds which are useful as catalysts are disclosed in the patents and published patent applications mentioned above as well as U.S. Pat. Nos. 3,094,595 and 3,222,348, British patents 849,589; 995,957 and 1,042,172, British patent application 2035341 and German patents 1,144,922; 1,199,992 and 1,495,935.

The cobalt compound can be any organic compound such as the cobalt salts of organic acids, cobalt complexes and the like, since the cobalt compound preferably should be soluble in the solvent or the monomer. Typical of such solvent or monomer soluble cobalt compounds are cobalt octoate, cobalt sorbate, cobalt adipate, cobalt 2-ethylhexanoate, cobalt stearate, cobalt acetylacetonate and the like compounds wherein the organic portion of the molecule contains about 5 to 20, preferably 8 to 18 carbon atoms and one or two carboxylic functions, as well as acetylacetonate, as are well known to those skilled in the art.

The other essential catalyst component is an organoaluminium compound preferably an alkyl aluminium halide which can be used as a mono- or dialkyl aluminium halide, a mixture thereof, or a mixture of $R_3Al$, $R_2AlX$, $RAlS_2$ or $AlX_3$ type compounds wherein R is an alkyl and X is halogen, more preferably, the chloride. The alkyl groups normally contain 1 to 12 carbon atoms, more preferably, about 2 to 8 carbon atoms. Particularly useful are dialkyl aluminium chlorides wherein the alkyl contains 2 to 6 carbon atoms, and the so-called sesquichloride which is a mixture of aluminium trichloride and trialkyl aluminium, normally having a composition of about $R_{1.5-1.9}AlX_{1.6-1.1}$.

Typical catalyst combinations are cobalt II octoate+ $Et_{1.66}AlCl_{1.33}$; cobalt II ethylhexoate+$Et_{1.33}$ $AlCl+H_2O$; cobalt-acetylacetone+$AlHCl_2$-ether; cobalt-3-acetylacetonate+$Et_3Al_2Cl_3$+ethyl acetate; cobalt diacetylacetonate+$Et_2AlCl$; cobalt stearate+$Et_2AlCl$; cobalt acetylacetonate–$Et_2AlCl$; and the like. These catalyst components are well known and clearly defined in the patent literature, as are the molar ratios of cobalt to aluminium and the amounts of catalyst components used.

It is normally preferred to operate in the range of aluminium to cobalt ratios between about 50:1 and 800:1. The amounts of catalyst used based on cobalt will generally be at least about 0.0005 millimol per 100 grams of butadiene up to about 5 to 10 millimols of cobalt per 100 grams. Normally, it is preferred to use from about 0.005 to about 0.5 millimols of cobalt per 100 grams of monomer. The concentration of aluminium will vary generally from as low as about 0.5 millimols to about 10 millimols or more per 100 grams of monomer, preferably about 1 to 4 millimoles. This generally means that less than about 2% by weight of total catalyst will be used. A preferred aluminium to cobalt ratio is from about 50 to about 300, and more preferably about 100 to 200.

Trace amounts of water are also a useful component of the polymerization recipe, normally added either in the solvents or monomers. The water to aluminium ratio often used is from about 0.1 to about 0.7 but ratios as low as 0.05 to as high as 0.9 are contemplated.

The catalyst components may be added in any order to the polymerization mixture or they may be premixed if desired. Solvents and/or monomer may be present during the addition of catalyst. Agitation is beneficial to obtain good heat transfer and diffusion of monomers. Batch and continuous polymerizations may be employed. It is understood, of course, that other than the catalyst water added to the polymerization, precautions are normally taken to exclude moisture and air, particularly oxygen and oxygen-containing materials. Moisture is normally controlled to the desired amount by use of dry reactants and maintaining an inner dry atmosphere over the polymerization materials including charging procedures.

In conducting polymerizations according to the present invention, a variety of polymerization procedures may be followed. One useful method is to charge the solvents and the monomer and then the catalyst components. The polymerization may be conducted within a temperature range of from −35° C. up to about 100° C. Normally the polymerization is conducted at a temperature in the range of from −10° C. to 50° C., and preferably between 5° and 40° C. A pressure autoclave may be employed and the pressure of the system, if any, at this temperature normally is observed.

The process of this invention is particularly effective when it is employed in combination with a specific order of addition of the catalysts the solvents and the monomer. Accordingly, a preferred embodiment of the process of the present invention to produce primarily linear, gel-free cis-1,4-polybutadiene is carried out in the presence of a catalyst comprising a mixture of a cobalt compound, at least one organoaluminium compound and water, characterized in that it comprises a) adding in any order to the polymerization vessel butadiene; water; an aluminium catalyst constituent containing at least one chlorine containing aluminium compound, said catalyst having a chlorine to aluminium ratio of between 0.1:1 and 1.6:1, wherein the aluminium to cobalt ratio is between 50:1 and 800:1 and the water to aluminium ratio is between 0.1:1 and 0.8:1; a cycloalkane of 5 to 8 carbon atoms in the ring; and b) thereafter adding a cobalt catalyst constituent and from 0.1 to 2 percent by weight of the cycloalkane of hereinbefore specified polymerization regulator, and c) polymerizing said butadiene-1,3 thereby producing gel-free cis-1,4-polybutadiene.

In the above improved process it is preferable that the molar ratio of aluminium to cobalt be in the range of 50:1 to 800:1 and more preferably 50:1 to 300:1; the molar ratio of chlorine to aluminium be in the range of 0.5:1 to 1.5:1, and the molar ratio of water to aluminium be in the range of 0.1:1 to 0.7:1 and more preferably 0.45:1 to 0.55:1.

In the preferred process, the cobalt compound is predissolved in an appropriate cycloalkane solvent. A convenient procedure is to first prepare a solution of a cobalt compound in a solvent such as cyclohexane the concentration of which is approximately 12 percent based on the cobalt (which solution is available commercially). Then the solution is diluted with either the same solvent or with alkylsubstituted benzene or a mixture thereof to the concentration of 0.0063 millimole/cc of the cobalt compound. Of course, the dilution could be made to a higher or a lower concentration if desired. An appropriate amount of the dilute solution of the cobalt catalyst is then added to the main reaction vessel to which has already been added main solvent wet butadiene and the aluminium catalyst constituent, the amount of water present being such that eventually the desired water to aluminium ratio will be established. Next an appropriate amount of polymerization regulator in predetermined amount of main solvent.

The most preferred modification of the present improved process comprises mixing the starting monomer with solvent, water, and the aluminium containing starting reagent and mixing this cocatalyst containing solution with the cobalt component and a polymerization regulator, as specified hereinbefore.

By "solvent" is meant a specific solvent or a mixture of two or more solvents, the mixtures being preferred.

Conversion of butadiene-1,3 to cis-1,4-polybutadiene is in the range of from 30 to 90 percent, but the degree of conversion is dependent on the concentration of butadiene, total catalyst concentration, catalyst component ratios, nature of the solvent, time of reaction, temperature, and possible other factors.

After polymerization has reached the desired degree of conversion, the reaction is normally stopped with an agent that reacts with the catalyst, such as water and alcohol, carboxylic acid, acetone, amine and the like, to destroy the catalyst and convert it to an oxygen insensitive material. This step is normally carried out in the absence of air. It is also often desirable to treat the reaction mixture to remove the catalyst residues. This can be effected, for example, by water washes, alcohol washes, and the like. The polymer may be simultaneously precipitated by the addition of alcohol solvent mixtures that both destroy the catalyst and precipitate the polymer as a solid crumb which may be further washed with water or alcohol which is thereafter dried.

The following examples are presented to further illustrate the process of this invention, however without restricting its scope to these embodiments.

EXAMPLES

Experimental Conditions

The following analytical techniques for high-cis polybutadiene were employed.

Microstructure determination (1,4-cis-content) was carried out with Fourier Transform InfraRed (FT-IR) spectroscopy using solutions of the polymer in $CS_2$.

Molecular weight determinations were carried out with Gel Permeation Chromatography using a WATERS GPC (trademark) system employing 2 "mixed bed" STYROGEL (trademark) columns in series, a differential refractive index (DRI) detector and THF as eluent.

Limiting viscosity numbers (LVN) were determined of polymer solutions in toluene at 25 C using a modified SCHULKEN-SPARKS (trademark) viscometer.

As a measure for the linearity of polymers prepared is used the branching index which is the ratio of the LVN derived from the GPC (viscosity averaged) molecular weight and the real LVN:

$$B.I. = \frac{LVN_{gpc}(dl/g)}{LVN_{real}(dl/g)}$$

All chemicals applied were handled under a dry nitrogen atmosphere. 1,3-Butadiene (Shell), 1-butene (ex-Hoek Loos) and cyclohexane (ex-Merck) were all purified prior to use by passage over alumina columns. Cobalt (II) acetylacetonate (ex-Chemische Fabriek Zaltbommel) and methoxy-substituted benzenes (ex-Aldrich Chem. Co.) were used as received. A 0.1M solution of diethylaluminium chloride (DEAC) in cyclohexane (ex-WITCO) was used as received.

Polymerizations were carried out in 0.5 L glass pressure bottles equipped with a rubber seal. After addition of ca. 150 gram of a mixture of cyclohexane, 1,-butadiene, 1-butene, and water and equilibration to the desired temperature (using a thermostated water-bath tumbler), an amount of DEAC in cyclohexane is added as to adjust the water/DEAC ratio to 0.5. Typically, at a water concentration of 30 ppm, 5 ml of a 0.1M solution of DEAC was used to give a DEAC level of ca. 400 ppm on feed.

Subsequently, the required amounts of polymerization rate moderator and cobalt (II) acetylacetonate were added to start the polymerization, which was allowed to proceed for 30–180 min. The polymerization was terminated by addition of a BHT/methanol mixture and a weighed sample was taken and dried overnight in a vacuum stove at 40° C. for conversion determination and polymer analysis.

Comparative Examples 1–6 and Examples 1–6

Table 1 shows conversion data of polymerizations carried out in the presence of various concentrations of different methoxy-substituted benzenes. A feed ratio of butadiene/butene/cyclohexane of 10/55/35 is used applying a cobalt level of 1.5 ppm wt. on feed at 30° C.

The conversion data demonstrate that the rate moderation efficiency of the agents tested increases strongly with the degree of methoxy-substitution. However, some of them tend to inhibit rather than moderate the polymerization at higher concentrations (e.g. 1,2,3-TMB). The most efficient polymerization regulator (i.e. 1,3,5-TMB) is elaborated in the next examples.

Examples 7–10 and Comparative Examples 7, 8 and 9

Table II shows conversion data of polymerizations carried out in the presence of various concentrations of 1,3,5-TMB and 1,2,4,5-tetramethylbenzene (durene). A feed ratio of butadiene/butene/cyclohexane of 15/55/30 is used applying a cobalt level of 1.5 ppm wt. on feed at 15° C.

Again, the high efficiency of 1,3,5-TMB is demonstrated (examples 7–10) as compared to the relatively high levels of durene (comparative examples 8, 9) needed to achieve a similar rate moderation.

The product data given in Table II demonstrate that 1,3,5-TMB does not affect the polymer characteristics as compared to comparative example 7.

TABLE 1

Conversion data using different methoxy-substituted benzene polymerization regulators at 30° C.

| Ex | Moderator[a] | Conc.[b] (ppm) | Conv. (%) (30 min.) | Conv. (%) (60 min.) | Conv. (%) (90 min) |
|---|---|---|---|---|---|
| Comp. 1 | None | 0 | 61 | 71 | 74 |
| Comp. 2 | Anisole | 200 | 38 | 48 | |
| Comp. 3 | 1,2-DMB | 100 | 0 | 0 | |
| Comp. 4 | 1,3-DMB | 100 | 43 | 52 | |
| Comp. 5 | 1,4-DMB | 50 | 55 | 66 | |
| Comp. 6 | 1,4-DMB | 100 | 35 | 44 | |
| 1 | 1,2,3-TMB | 10 | 56 | 66 | 70 |
| 2 | 1,2,3-TMB | 35 | 30 | 37 | |
| 3 | 1,2,4-TMB | 10 | 57 | 68 | 72 |
| 4 | 1,2,4-TMB | 35 | 39 | 46 | |
| 5 | 1,3,5-TMB | 10 | 55 | 67 | 72 |
| 6 | 1,3,5-TMB | 35 | 37 | 48 | |

[a]Anisole = mono-methoxybenzene; DTBHA = 2,5-di-tert-butyl-4-hydroxyanisol; DMB = dimethoxybenzene; TMB = trimethoxybenzene.
[b]Regulator concentration in ppm wt. on polymerization feed (butadiene/1-butene/cyclohexane = 10/55/35).

TABLE II

Conversion data using 1,3,5-TMB and durene as polymerization regulators at 15° C.

| Ex | Moderator[a] | Conc.[b] (ppm) | Conv. (%) (30 min.) | Conv. (%) (60 min.) | Conv. (%) (90 min) |
|---|---|---|---|---|---|
| Comp. 7 | None | 0 | 64 | 72 | |
| 7 | 1,3,5-TMB | 10 | 51 | 60 | 73 |
| 8 | 1,3,5-TMB | 25 | 47 | 56 | 68 |
| 9 | 1,3,5-TMB | 35 | 42 | 50 | 63 |
| 10 | 1,3,5-TMB | 50 | 42 | 50 | 63 |
| Comp. 8 | Durene | 150 | 55 | 65 | 78 |
| Comp. 9 | Durene | 300 | 47 | 58 | 75 |

[a]TMB = trimethoxybenzene; durene = 1,2,4,5-tetramethylbenzene.
[b]Regulator concentration in ppm wt. on polymersiation feed (butadiene/1-butene/cyclohexane = 15/55/30).

TABLE III

Polymer characterisation data using 1,3,5-TMB and durene as polymerization regulators at 15° C.[a]

| Ex. | Moderator[b] | Conc.[c] | Mn | Mw | Mw/Mn | LVN (dl/g) | BI | 1,4-cis (%) |
|---|---|---|---|---|---|---|---|---|
| Comp. 10 | None | 0 | 81000 | 200000 | 2.47 | 2.0 | 1.15 | 97.0 |
| 11 | 1,3,5-TMB | 10 | 77200 | 222400 | 2.88 | 1.9 | 1.17 | 96.9 |
| 12 | 1,3,5-TMB | 25 | 89540 | 206400 | 2.30 | 1.9 | 1.12 | 97.6 |
| 13 | 1,3,5-TMB | 35 | 75580 | 185200 | 2.45 | 1.7 | 1.14 | 98.0 |
| 14 | 1,3,5-TMB | 50 | 74000 | 183700 | 2.48 | 1.7 | 1.15 | 97.8 |
| | None | 0 | 80000 | 231000 | 2.80 | 2.0 | 1.14 | 97.8 |
| | Durene | 150 | 75900 | 216400 | 2.85 | 1.9 | 1.16 | 97.0 |
| | Durene | 300 | 60000 | 196600 | 3.29 | 1.7 | 1.17 | 96.8 |

[a]Samples taken at ca. 60% (1,3,5-TMB) and 75% (durene) conversion, respectively.
[b]TMB = trimethoxybenzene; durene = 1,2,4,5-tetramethylbenzene.
[c]Regulator concentration in ppm wt. on polymerization feed (butadiene/1-butene/cyclohexane = 15/55/30).

TABLE IV

Conversion data using 1,3,5-TMB and durene as polymerization regulators at 25° C.

| Ex | Moderator[a] (180 min) | Conc.[b] (ppm) | Conv. (%) (60 min.) | Conv. (%) (90 min.) | Conv. (%) (180 min.) |
|---|---|---|---|---|---|
| Comp. 10 | None | 0 | 70 | 75 | |
| 11 | 1,3,5-TMB | 15 | 59 | 66 | 75 |
| 12 | 1,3,5-TMB | 30 | 48 | 57 | 68 |
| Comp. 11 | Durene | 100 | 65 | 71 | 78 |
| Comp. 12 | Durene | 300 | 59 | 69 | 80 |

[a]TMB = trimethoxybenzene; durene = 1,2,4,5-etramethylbenzene.
[b]Regulator concentration in ppm wt. on polymersiation feed (butadiene/1-butene/cyclohexane = 15/50/30).

TABLE V

Polymer characterisation data using 1,3,5-TMB and durene as polymerization regulators at 25 Ca.

| Ex. | Moderator[b] | Conc.[c] | Mn | Mw | Mw/Mn |
|---|---|---|---|---|---|
| Comp. 13 | None | 0 | 78000 | 226000 | 2.90 |
| 13 | 1,3,5-TMB | 20 | 73300 | 184000 | 2.50 |
| Comp. 14 | 1,3,5-TMB | 300 | 75000 | 20500 | 2.70 |

[a]Samples taken at ca. 75% conversion.
[b]TMB = trimethoxybenzene; durene = 1,2,4,5-tetra-methylbenzene.
[c]Regulator concentration in ppm wt. on polymerization feed (butadiene/1-butene/cyclohexane = 15/50/30).

We claim:

1. A process for the manufacture of linear, substantially gel free, high cis 1,4-poly(butadiene) comprising polymerization of 1,3-butadiene in an organic solvent in the presence of (a) a catalyst comprising at least one cobalt compound, at least one organoaluminum compound, and water, and (b) a cycloalkane as the main solvent component, and (c) at least one substituted benzene polymerization regulator of the general formula

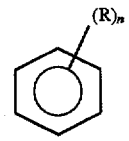

wherein n is an integer in the range of from 3 to 5, and wherein each R represents a lower alkoxy group containing from 1 to 6 carbon atoms.

2. The process according to claim 1 characterized in that each R represents a lower alkoxy group containing from 1 to 4 carbon atoms.

3. The process according to claim 1 characterized in that the polymerization regulator contain 3 or 4 lower alkoxy groups.

4. The process according to claim 3 characterized in that 3 or 4 methoxy groups are present.

5. The process according to claim 4 characterized in that 1,3,5-trimethoxy benzene is used as polymerization regulator.

6. The process according to claim 1 characterized in that the polymerization regulator is used in an amount of less than 100 ppm relative to the weight of the polymerization feed.

7. The process according to claim 6 characterized in that the polymerization regulator is used in an amount of from 5 to 60 ppm.

8. The process according to claim 7 characterized in that the polymerization regulator is used in an amount of from 5 to 40 ppm.

9. The process according to claim 1 characterized in that the main solvent is a cycloalkane having 5 or 6 carbon atoms.

* * * * *